United States Patent
Al-Zahrani (10) Patent No.: US 10,677,030 B2
(45) Date of Patent: Jun. 9, 2020

(54) CLICK TOGETHER ELECTRICAL SUBMERSIBLE PUMP

(71) Applicant: SAUDI ARABIAN OIL COMPANY, Dhahran (SA)

(72) Inventor: Abdullah M. Al-Zahrani, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 243 days.

(21) Appl. No.: 15/243,190

(22) Filed: Aug. 22, 2016

(65) Prior Publication Data

US 2018/0051543 A1    Feb. 22, 2018

(51) Int. Cl.
*E21B 43/12* (2006.01)
*E21B 47/00* (2012.01)
(Continued)

(52) U.S. Cl.
CPC ........ *E21B 43/128* (2013.01); *E21B 47/0007* (2013.01); *H01R 13/02* (2013.01);
(Continued)

(58) Field of Classification Search
CPC .... E21B 43/128; E21B 17/06; E21B 47/0007; H01R 13/2219; H01R 13/02;
(Continued)

(56) References Cited

U.S. PATENT DOCUMENTS 3,508,188 A    4/1970 Buck
4,537,257 A    8/1985 Todd
(Continued)

FOREIGN PATENT DOCUMENTS

FR    2578587 A1    9/1986
GB    2345307 A    7/2000
(Continued)

OTHER PUBLICATIONS

International Search Report and Written Opinion for related PCT application PCT/US2017/047698 dated Feb. 2, 2018.
(Continued)

*Primary Examiner* — Robert E Fuller
*Assistant Examiner* — Christopher J Sebesta
(74) *Attorney, Agent, or Firm* — Bracewell LLP; Constance G. Rhebergen; Linda L. Morgan (57) ABSTRACT

An electrical submersible pump assembly for producing hydrocarbons from a subterranean well includes a motor-seal click connector releasably connecting a motor to a seal section and engaged by relative axial movement between the motor and the seal section, and a pump-seal click connector releasably connecting the pump to the seal section and engaged by relative axial movement between the pump and the seal section. Electrical conductors are located within a sidewall of the motor housing, a sidewall of the seal section housing, and a sidewall of the pump housing. A male motor-seal electrical connector is axially extending and electrically connects the electrical conductors of the motor housing with the electrical conductors of the seal section housing. A male pump-seal electrical connector is axially extending and electrically connects the electrical conductors of the pump housing with the electrical conductors of the seal section housing.

22 Claims, 4 Drawing Sheets

(51) Int. Cl.
*H02K 5/132* (2006.01)
*H02K 5/22* (2006.01)
*H01R 13/02* (2006.01)
*H01R 13/523* (2006.01)
*H01R 13/52* (2006.01)

(52) U.S. Cl.
CPC ........... *H01R 13/523* (2013.01); *H02K 5/132* (2013.01); *H02K 5/225* (2013.01); *H01R 13/5216* (2013.01)

(58) Field of Classification Search
CPC .............. H01R 13/523; H01R 13/6272; H01R 13/6315; H01R 13/5219; H02K 5/132; H02K 5/225; H02K 5/128
See application file for complete search history.

(56) References Cited

U.S. PATENT DOCUMENTS

| | | | |
|---|---|---|---|
| 6,089,322 A | 7/2000 | Kelley et al. | |
| 6,325,143 B1 | 12/2001 | Scarsdale | |
| 6,457,531 B1 | 10/2002 | Bangash et al. | |
| 6,595,295 B1 | 7/2003 | Berry et al. | |
| 7,543,643 B2 * | 6/2009 | Hill | E21B 36/04 166/302 |
| 8,316,949 B2 | 11/2012 | Rooks | |
| 8,448,699 B2 | 5/2013 | Camilleri et al. | |
| 8,708,727 B2 | 4/2014 | Spahi et al. | |
| 8,950,476 B2 | 2/2015 | Head | |
| 8,968,018 B2 | 3/2015 | Sivik et al. | |
| 9,175,692 B2 | 11/2015 | Nowitzki et al. | |
| 2002/0125014 A1 | 9/2002 | Dearing et al. | |
| 2006/0245957 A1 | 11/2006 | Berry et al. | |
| 2009/0211753 A1 | 8/2009 | Emtiazian et al. | |
| 2010/0035452 A1 * | 2/2010 | Mudge, III | H01R 13/533 439/271 |
| 2011/0142697 A1 * | 6/2011 | Petrucci | F04D 29/426 417/422 |
| 2011/0186302 A1 | 8/2011 | Coyle et al. | |
| 2012/0012332 A1 | 1/2012 | Rooks | |
| 2012/0049513 A1 * | 3/2012 | Herrera | E21B 17/046 285/331 |
| 2012/0117793 A1 | 5/2012 | Beurthey et al. | |
| 2012/0181043 A1 | 7/2012 | Patel | |
| 2014/0050603 A1 | 2/2014 | Hoj | |
| 2015/0130185 A1 * | 5/2015 | Knapp | F16L 19/0231 285/330 |
| 2015/0255974 A1 * | 9/2015 | Burrow | E21B 17/028 174/77 R |
| 2016/0024854 A1 * | 1/2016 | Clingman | E21B 43/128 166/378 |
| 2016/0290063 A1 * | 10/2016 | Richards | E21B 17/003 |
| 2017/0254172 A1 | 9/2017 | Mack et al. | |

FOREIGN PATENT DOCUMENTS

| | | |
|---|---|---|
| WO | WO2006031478 A1 | 3/2006 |
| WO | WO2015199550 A2 | 12/2015 |

OTHER PUBLICATIONS

International Search Report and Written Opinion for related PCT application PCT/US2018/016363 dated May 3, 2018.

* cited by examiner

CLICK TOGETHER ELECTRICAL SUBMERSIBLE PUMP

BACKGROUND OF THE DISCLOSURE

1. Field of the Disclosure

The disclosure relates generally to electrical submersible pumps and in particular, to electrical submersible pump assemblies with click-together assembly.

2. Description of the Related Art

One method of producing hydrocarbon fluid from a well bore that lacks sufficient internal pressure for natural production is to utilize an artificial lift method such as an electrical submersible pump. A string of tubing or pipe known as a production string suspends the submersible pumping device near the bottom of the well bore proximate to the producing formation. The submersible pumping device is operable to retrieve production zone fluid, impart a higher pressure into the fluid and discharge the pressurized production zone fluid into production tubing. Pressurized well bore fluid rises towards the surface motivated by difference in pressure.

Current electrical submersible pumps are manufactured in three major parts which are: motor, seal section and pump. A current common deployment method is to install the electrical submersible pump with a rig and complete the well with a packer above the electrical submersible pump where the power cable is spliced and terminated. The splice and termination is a potential weak point that can cause the electrical submersible pump system to fail. Operators have to make up the system on the rig floor. Each of the motor, seal section and pump have threaded ends that operators must tighten into each other, which is time consuming operation.

SUMMARY OF THE DISCLOSURE

Embodiments disclosed herein provide an electrical submersible pump assembly that has a motor, seal section and pump that can click into each other while the electrical conductors are built in the body of the motor, seal and pump. The electrical connectors can have pins that expand through bags full of chemical product to provide with dry environment during the termination of the power system. The electrical submersible pump assembly can be put together by two operators and deployed rig-less with coiled tubing. The production fluids are produced through the coiled tubing. Systems and methods disclosed herein are simple to assemble and deploy relative to some current systems, which reduces human error and saves on costs.

In an embodiment of this disclosure, an electrical submersible pump assembly for producing hydrocarbons from a subterranean well includes a motor with a motor housing, a seal section with a seal section housing, and a pump with a pump housing. A motor-seal click connector releasably connects the motor to the seal section and is engaged by relative axial movement between the motor and the seal section. A pump-seal click connector releasably connects the pump to the seal section and is engaged by relative axial movement between the pump and the seal section. Electrical conductors are located within a sidewall of the motor housing, a sidewall of the seal section housing, and a sidewall of the pump housing. A male motor-seal electrical connector is axially extending and electrically connects the electrical conductors of the motor housing with the electrical conductors of the seal section housing. A male pump-seal electrical connector is axially extending and electrically connects the electrical conductors of the pump housing with the electrical conductors of the seal section housing.

In alternate embodiments, a female motor-seal electrical connector can be aligned with the male motor-seal electrical connector, wherein the male motor-seal electrical connector can be extendable into the female motor-seal electrical connectors. A female pump-seal electrical connector can be aligned with the male pump-seal electrical connector, wherein the male pump-seal electrical connector can be extendable into the female pump-seal electrical connector. The male motor-seal electrical connector can be located on one of the motor housing and the seal section housing and the female motor-seal electrical connectors can located on the other of the motor housing and the seal section housing. The male pump-seal electrical connector can be located on one of the pump housing and the seal section housing and the female motor-seal electrical connectors can be located on the other of the pump housing and the seal section housing.

In other alternate embodiments, the assembly can include a container of a chemical product, the chemical product being releasable by a protrusion of one of the male motor-seal electrical connector and the male pump-seal electrical connector and surrounding the one of the male motor-seal electrical connector and the male pump-seal electrical connector. The male motor-seal electrical connector and the male pump-seal electrical connector can be moveable from a retracted position to an extended position where the male motor-seal electrical connector and the male pump-seal electrical connector extend through the chemical product. The male motor-seal electrical connector and the male pump-seal electrical connector can be moveable between a retracted position where segments of the male motor-seal electrical connector and the male pump-seal electrical connector are nested and an extended position where the segments are positioned end to end.

In yet other alternate embodiments, the motor-seal click connector can include a radially biased arm located on one of the motor and the seal section that engages a recess of the other of the motor and the seal section. The pump-seal click connector can include a radially biased arm located on one of the pump and the seal section that engages a recess of the other of the pump and the seal section.

In an alternate embodiment of this disclosure, an electrical submersible pump assembly for producing hydrocarbons from a subterranean well includes a motor with a motor housing, a seal section with a seal section housing, and a pump with a pump housing. A click connector releasably connects the motor and the pump and the seal section and is engaged by relative axial movement between the motor and the pump and the seal section. Electrical conductors are located within a sidewall of the motor housing, a sidewall of the seal section housing, and a sidewall of the pump housing. Electrical connectors electrically connect the electrical conductors of the motor housing with the electrical conductors of the seal section housing and connect the electrical conductors of the pump housing with the electrical conductors of the seal section housing. The electrical connectors are surrounded by a chemical product during a connection operation of the electrical conductors.

In alternate embodiments the electrical connectors can include male motor-seal electrical connectors axially extending and located on one of the motor housing and the seal section housing, and female motor-seal electrical connectors located on the other of the motor housing and the seal section housing and aligned with the male motor-seal electrical connectors, wherein the male motor-seal electrical connectors can be extendable into the female motor-seal electrical connectors. Male pump-seal electrical connectors can be axially extending and located on one of the pump housing and the seal section housing and female pump-seal electrical connectors can be located on the other of the pump housing and the seal section housing and aligned with the male pump-seal electrical connectors, wherein the male pump-seal electrical connectors are extendable into the female pump-seal electrical connectors.

In other alternate embodiments, the chemical product can be located in a container located at an end of the pump housing, and end of the motor housing, and at a first and second end of the seal section housing. The electrical connectors can include a male electrical connector that is moveable from a retracted position to an extended position where the male electrical connector extends through the chemical product. The electrical connectors can include male electrical connectors that are moveable between a retracted position where segments of the male The click connector can include a radially biased arm located on one of the motor, the pump, and the seal section that engages a recess on another of the motor, the pump, and the seal section.

In another alternate embodiment of this disclosure, a method for producing hydrocarbons from a subterranean well with an electrical submersible pump assembly includes providing a motor with a motor housing, a seal section with a seal section housing, a pump with a pump housing, and electrical conductors located within a sidewall of the motor housing, a sidewall of the seal section housing, and a sidewall of the pump housing. The motor is releasably connected to the seal section with a motor-seal click connector by relative axial movement between the motor and the seal section. The pump is releasably connected to the seal section with a pump-seal click connector by relative axial movement between the pump and the seal section. The electrical conductors of the motor housing are electrically connected with the electrical conductors of the seal section housing with an axially extending male motor-seal electrical connector. The electrical conductors of the pump housing are electrically connected with the electrical conductors of the seal section housing with an axially extending male pump-seal electrical connector.

In alternate embodiments, the electrical conductors of the motor housing can be electrically connected with the electrical conductors of the seal section housing by aligning the male motor-seal electrical connector with a female motor-seal electrical connector and extending the male motor-seal electrical connector into the female motor-seal electrical connector. The electrical conductors of the pump housing can be electrically connected with the electrical conductors of the seal section housing by aligning the male pump-seal electrical connector with a female pump-seal electrical connector and extending the male pump-seal electrical connector into the female pump-seal electrical connector.

In other alternate embodiments, a chemical product can be released to surround one of the male motor-seal electrical connector and the male pump-seal electrical connector during the electrical connection of such male motor-seal electrical connector or male pump-seal electrical connector. The male motor-seal electrical connector and the male pump-seal electrical connector can be moveable between a retracted position where segments of the male motor-seal electrical connector and the male pump-seal electrical connector are nested and an extended position where the segments are positioned end to end. The motor can be releasably connected to the seal section by locating a radially biased arm of the motor-seal click connector of one of the motor and the seal section that into a recess of the other of the motor and the seal section. The pump can be releasably connected to the seal section by locating a radially biased arm of the pump-seal click connector of one of the pump and the seal section into a recess of the other of the pump and the seal section.

BRIEF DESCRIPTION OF THE DRAWINGS

So that the manner in which the above-recited features, aspects and advantages of the embodiments of this disclosure, as well as others that will become apparent, are attained and can be understood in detail, a more particular description of the disclosure briefly summarized above may be had by reference to the embodiments thereof that are illustrated in the drawings that form a part of this specification. It is to be noted, however, that the appended drawings illustrate only preferred embodiments of the disclosure and are, therefore, not to be considered limiting of the disclosure's scope, for the disclosure may admit to other equally effective embodiments.

DETAILED DESCRIPTION

Embodiments of the present disclosure will now be described more fully hereinafter with reference to the accompanying drawings which illustrate embodiments of the disclosure. Systems and methods of this disclosure may, however, be embodied in many different forms and should not be construed as limited to the illustrated embodiments set forth herein. Rather, these embodiments are provided so that this disclosure will be thorough and complete, and will fully convey the scope of the disclosure to those skilled in the art. Like numbers refer to like elements throughout, and the prime notation, if used, indicates similar elements in alternative embodiments or positions.

In the following discussion, numerous specific details are set forth to provide a thorough understanding of the present disclosure. However, it will be obvious to those skilled in the art that embodiments of the present disclosure can be practiced without such specific details. Additionally, for the most part, details concerning well drilling, reservoir testing, well completion and the like have been omitted inasmuch as such details are not considered necessary to obtain a complete understanding of the present disclosure, and are considered to be within the skills of persons skilled in the relevant art.

Figure 1:
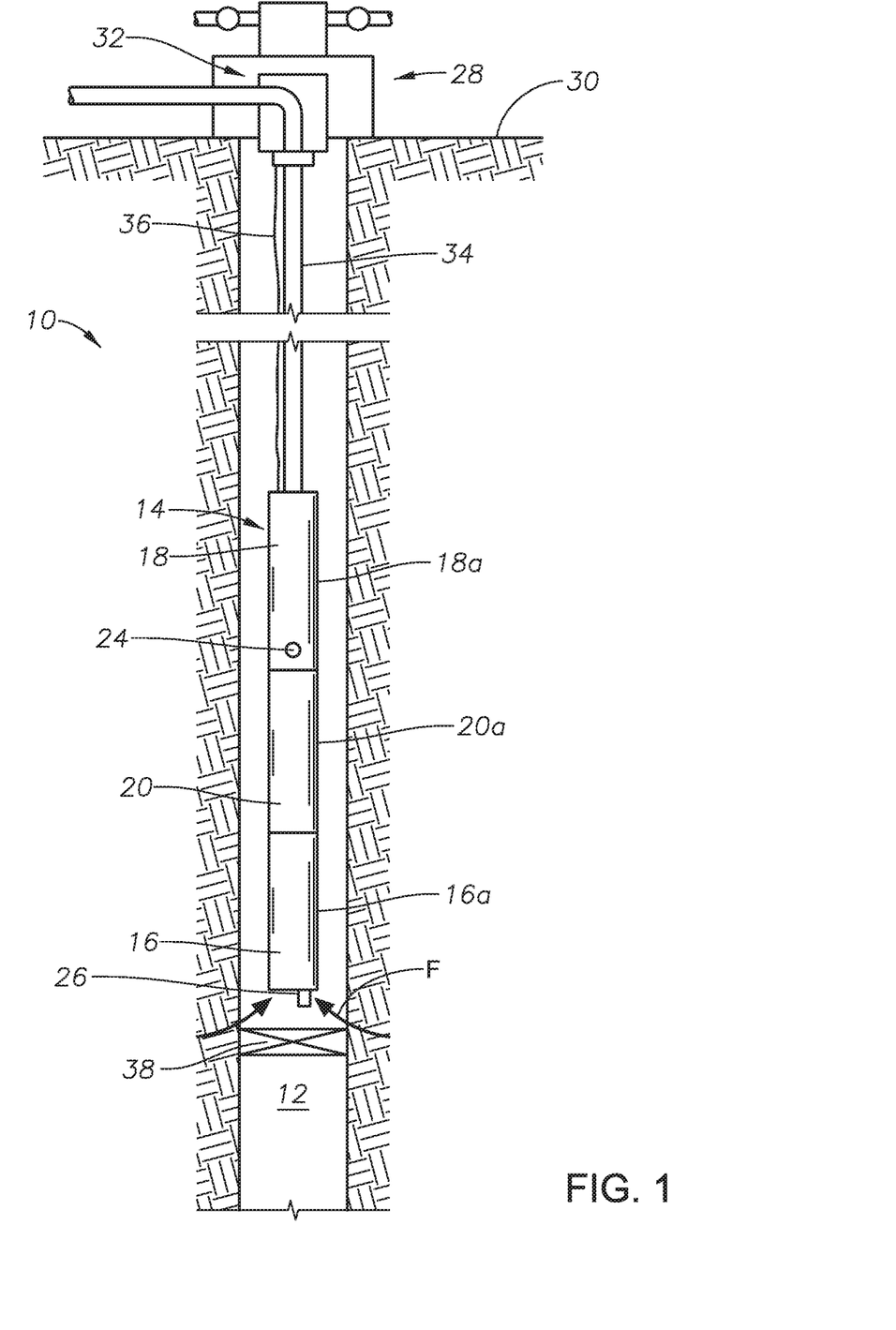
FIG. 1 is a section view of a subterranean well having an electrical submersible pump assembly, in accordance with an embodiment of this disclosure.

Looking at FIG. 1, subterranean well 10 includes wellbore 12. Electrical submersible pump assembly 14 is located within wellbore 12. Electrical submersible pump assembly 14 of FIG. 1 includes motor 16 on its lowermost end which is used to drive a pump 18 at an upper portion of electrical submersible pump 14 assembly. Between motor 16 and pump 18 is seal section 20 for equalizing pressure within electrical submersible pump assembly 14 with that of wellbore 12. Certain elements of motor 16 are enclosed within motor housing 16a, which is a generally cylindrically shaped member with a sidewall defining an inner cavity that houses elements of motor 16. Certain elements of seal section 20 are enclosed within seal section housing 20a, which is a generally cylindrically shaped member with a sidewall defining an inner cavity that houses elements of seal section 20. Certain elements of pump 18 are enclosed within pump housing 18a, which is a generally cylindrically shaped member with a sidewall defining an inner cavity that houses elements of pump 18.

Sensor 26 can be included in electrical submersible pump assembly 14. In the example embodiment of FIG. 1, sensor 26 is located at a lower end of motor 16. Sensor 26 can gather and provide data relating to operations of electrical submersible pump assembly 14 and conditions within wellbore 12. As an example, sensor 26 can monitor and report pump 18 intake pressure and temperature, pump 18 discharge pressure and temperature, motor 16 oil and motor 16 winding temperature, vibration of electrical submersible pump assembly 14 in multiple axis, and any leakage of electrical submersible pump assembly 14.

Fluid F is shown entering wellbore 12 from a formation adjacent wellbore 12. Fluid F flows to inlet 24 formed in the housing of pump 18. Fluid F is pressurized within pump 18 and travels up to wellhead assembly 28 at surface 30 through coiled tubing 34. Electrical submersible pump assembly 14 is suspended within wellbore 12 with coiled tubing 34. Coiled tubing 34 is an elongated tubular member that extends within subterranean well 10. Coiled tubing 34 can be formed of carbon steel material, carbon fiber tube, or other types of corrosion resistance alloys or coatings.

A connector assembly 32 shown within wellhead assembly provides a means for anchoring tubing 34 within wellhead assembly 28. Power cable 36 extends through wellbore 12 alongside coiled tubing 34. Power cable 36 can provide the power required to operate motor 16 of electrical submersible pump assembly 14. Power cable 36 can be a suitable power cable for powering an electrical submersible pump assembly 14, known to those with skill in the art. Surface controlled isolation valve 38 can be installed within wellbore 12 axially below electrical submersible assembly 14. Because fluid F is produced through coiled tubing 34, there is no outlet releasing fluids within pump 18 into wellbore 12 and production fluids are not produced through the tubing-casing annulus. Packer 39 is located axially above inlet 24 of electrical submersible pump assembly 14. Surface controlled isolation valve 38 and packer 39 isolate a portion of wellbore 12 in which electrical submersible assembly 14 is located from other portions of wellbore 12.

Figure 2:
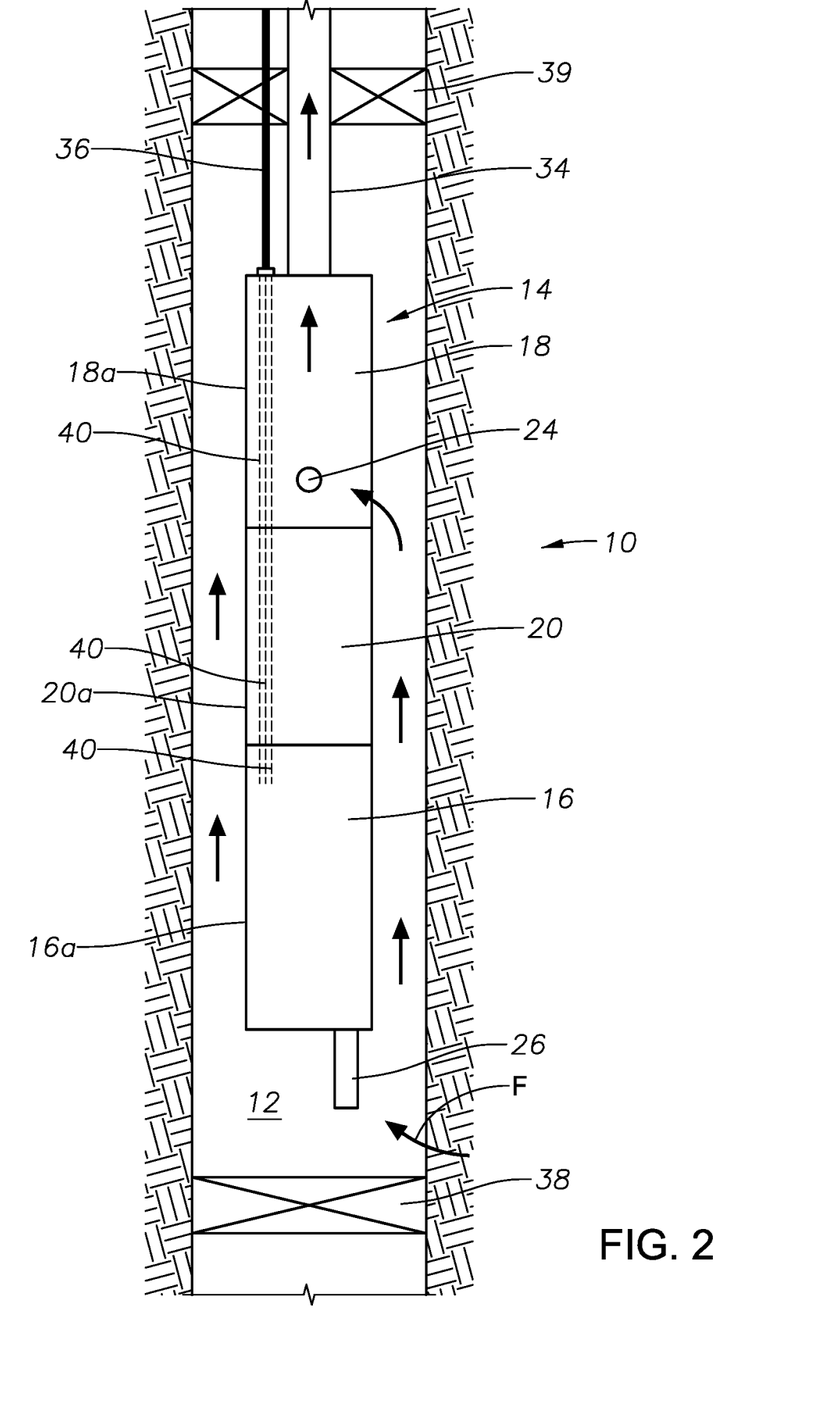
FIG. 2 is a section view of an electrical submersible pump assembly, in accordance with an embodiment of this disclosure.

Looking at FIG. 2, electrical conductors 40 are located within the sidewall of motor housing 16a, the sidewall of seal section housing 20a, and the sidewall of pump housing 18a. Electrical conductors 40 can transmit power from power cable 36 to motor 16 for providing the power to operate motor 16. Electrical conductors 40 can include three separately insulated conductors that extend axially along motor housing 16a, seal section housing 20a, and pump housing 18a. In alternate embodiments, there may be as few as one electrical conductor 40 or more than three electrical conductors 40, as required for the operation of electrical submersible pump assembly 14. Electrical conductors 40 can be located within the sidewall of motor housing 16a, seal section housing 20a, and pump housing 18a proximate to the outer diameter surface of motor housing 16a, seal section housing 20a, and pump housing 18a, respectively. In alternate embodiments, electrical conductors 40 can be enclosed entirely within a middle portion of motor housing 16a, seal section housing 20a, and pump housing 18a.

Figure 3:
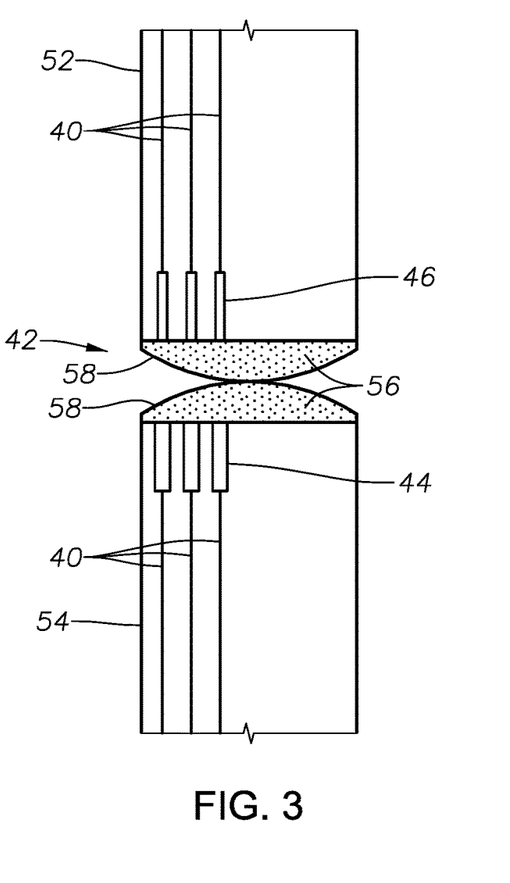
FIG. 3 is a section view of electrical connectors and chemical product of an electrical submersible pump assembly, in accordance with an embodiment of this disclosure.

Looking at FIG. 3, in order to connect electrical conductors 40 of motor housing 16a with electrical conductors 40 of seal section housing 20a, and to connect electrical conductors 40 of pump housing 18a with electrical conductors 40 of seal section housing 20a, electrical connectors 42 are used. Electrical connectors 42 include male electrical connectors 44 and female electrical connectors 46. Electrical connectors 42 are located on motor housing 16a, seal section housing 20a and pump housing 18a, in each case at an end of electrical conductors 40.

Figure 4A:
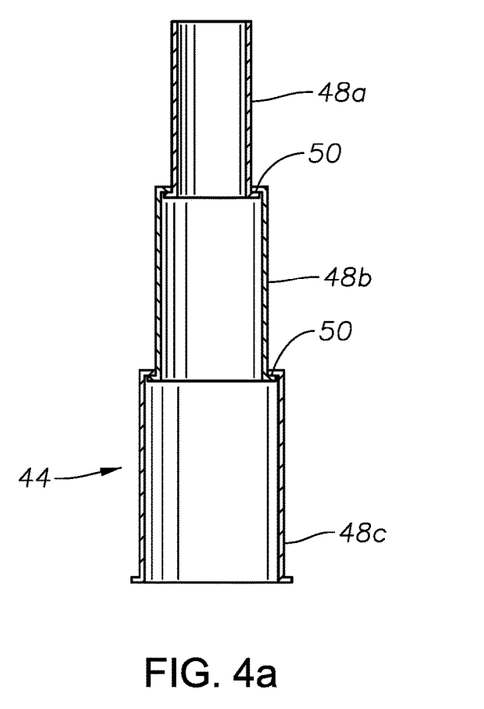
FIG. 4A is a section view of a male electrical connector in an extended position, in accordance with an embodiment of this disclosure.
Figure 4B:
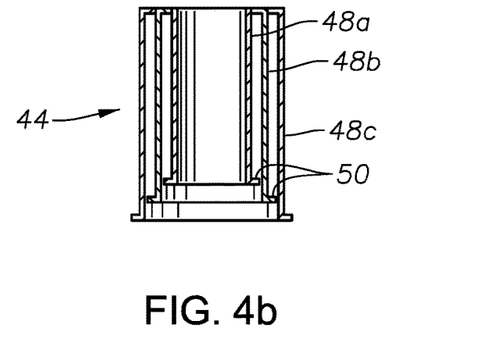
FIG. 4B is a section view of a male electrical connector in a retracted position, in accordance with an embodiment of this disclosure.

Male electrical connectors 44 are axially extending members sized to protrude into female electrical connectors 46. Each male electrical connector 44 is moveable between a retracted position (FIG. 4b) where segments 48a-48c of male electrical connector 44 are nested and an extended position (FIG. 48a) where segments 48a-48c are positioned end to end. Segments 48a-48c each has a different size of diameter so that when male electrical connector 44 is in the retracted position, segment 48a with the smallest diameter can be circumscribed by segment 48b and located within an inner bore of segment 48b. Segment 48b can in tern can be circumscribed by segment 48c and be located within an inner bore of segment 48c. Segment 48c can be a bore within motor housing 16a, seal section housing 20a or pump housing 18a so that in the retracted position, segments 48a and 48b can have an end flush with, or proximate to, such housing and male electrical connector 44 is overall recessed within, and does not protrude from, such housing.

When male electrical connectors 44 are in the extended position, segments 48a-48c are positioned end to end with only a minimal portion of segment 48a located within the bore of segment 48b and a minimal portion of segment 48b located within the bore of segment 48c. Segments 48a and 48b can have lip 50 at an inner end that engages an inner diameter of an opening at an end of segments 48b and 48c respectively, so that segments 48a and 48b have a stopping point when moving to an extended position. The mechanism to expand male electrical connectors 44 can be mechanical, electrical, hydraulic, thermal or a combination thereof.

Female electrical connectors 46 are elongated recesses into which male electrical connectors 44 are extendable. When male electrical connector 44 is extended into female electrical connector 46, an electrical connection between adjacent electrical conductors 40 is made. Looking at FIG. 3, upper housing 52 can be seal section housing 20a and lower housing 54 can be motor housing 16a. In order to connect electrical conductors 40 of motor housing 16a with electrical conductors 40 of seal section housing 20a, male electrical connectors 44 (also referred to as male motor-seal electrical connectors in such an embodiment) are located on one of motor housing 16a or seal section housing 20a and female electrical connectors 46 (also referred to as female motor-seal electrical connectors in such an embodiment) are located on the other of motor housing 16a or seal section housing 20a.

Looking at FIG. 3, upper housing 52 can instead be pump housing 18a and lower housing 54 can be seal section housing 20a. In order to connect electrical conductors 40 of pump housing 18a with electrical conductors 40 of seal section housing 20a, male electrical connectors 44 (also referred to as male pump-seal electrical connectors in such an embodiment) are located on one of pump housing 18a or seal section housing 20a and female electrical connectors 46 (also referred to as female pump-seal electrical connectors in such an embodiment) are located on the other of pump housing 18a or seal section housing 20a.

In order to protect electrical connectors 42 from adverse environmental conditions when making up electrical connectors 42, as male connectors 44 move from the retracted position to the extended position, chemical product 56 can be released. Chemical product 56 is sufficiently viscous to displace any fluids around electrical conductors 42 as electrical conductors 42 expand to make up a conductive connection. Chemical product 56 can be contained in a container 58 at one end of pump housing 18a and motor housing 16a and at both first and second ends of seal section housing 20a. When male connectors 44 move from the retracted position to the extended position, male connectors 44 can protrude into and extend through container 58, so that chemical product 56 surrounds electrical connectors 42, displacing any environmental fluids as the electrical connection of electrical conductors 40 is made.

In order to safely and simply releasably connect pump 18 and motor 16 to seal section 20, a click connector can be used. Looking at FIG. 5, an example of one embodiment of click connector 60 is provided. In alternate embodiments, click connector 60 is an alternate connector that provides a metal to metal seal, as known in the art. Click connector 60 allows for motor 16 to be quickly connected to seal section 20 by relative axial movement between motor 16 and the seal section 20, without the need to thread motor 16 and seal section 20 together.

Figure 5:
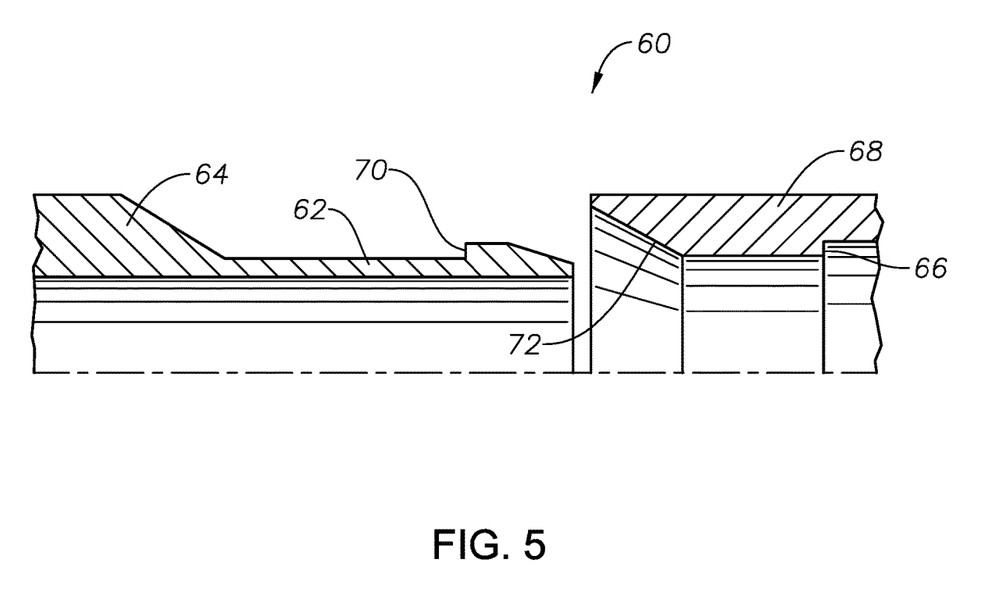
FIG. 5 is a section view of a click connector of an electrical submersible pump assembly, in accordance with an embodiment of this disclosure.

Click connector 60 of FIG. 5 includes radially biased arm 62 of first member 64 and recess 66 of second member 68. Radially based arm is an elongated member that extends generally axially. First member 64 can have a plurality of radially biased arms 62. Recess 66 is an annular inner shoulder of second member 68.

Radially biased arm 62 has profile 70 that is moved radially inward as first member 64 and second member 68 are moved axially towards each other. Second member 68 can have a sloped shoulder 72 to assist in pushing radially biased arm 62 radially inward. When profile 70 reaches recess 66 of second member 68, radial arm will spring radially outward so that profile 70 engages recess 66. The engagement of profile 70 with recess 66 will releasably connect first member 64 and second member 68.

Looking at FIG. 5, first member 64 can be seal section 20 and second member 68 can be pump 18. In order to releasably connect pump 18 to seal section 20, click connector 60 (also known as pump-seal click connector) can be used. Although radially biased arm 62 is shown on first member 64 (which can be seal section 20) and recess 66 is shown on second member 68 (which can be pump 18), in alternate embodiments, radially biased arm 62 can be located on second member 68 and recess 66 can be located on first member 64.

First member 64 can instead be motor 16 and second member 68 can be seal section 20. In order to releasably connect motor 16 to seal section 20, click connector 60 (also known as motor-seal click connector) can be used. Although radially biased arm 62 is shown on first member 64 (which can be motor 16) and recess 66 is shown on second member 68 (which can be seal section 20), in alternate embodiments, radially biased arm 62 can be located on second member 68 and recess 66 can be located on first member 64.

In an example of operation, wellbore 12 can be drilled in a conventional manner and surface controlled isolation valve 38 can be set. Electrical submersible pump assembly 14 can be assembled by releasably connecting motor 16 to seal section 20 with a motor-seal click connector by relative axial movement between motor 16 and seal section 20, and by releasably connecting pump 18 to seal section 20 with a pump-seal click connector by relative axial movement between pump 18 and seal section 20.

With pump 18, seal section 20 and motor 16 releasably connected to each other, male motor-seal electrical connectors will be aligned with female motor-seal electrical connectors and the male motor-seal electrical connectors can be moved to the extended position so that the male motor-seal connectors extend into the female motor-seal electrical connectors. This will electrically connect electrical conductors 40 of motor housing 16a with electrical conductors 40 of seal section housing 20a. As the male motor-seal electrical connectors are being extended into the female motor-seal electrical connectors, chemical product 56 will surround electrical connectors 42, displacing any environmental fluids and creating a dry surface around electrical connectors 42 during the electrical connection process.

With pump 18, seal section 20 and motor 16 releasably connected to each other, male pump-seal electrical connectors will be aligned with female pump-seal electrical connectors and the male pump-seal electrical connectors can be moved to the extended position so that the male pump-seal connectors extend into the female pump-seal electrical connectors. This will electrically connect electrical conductors 40 of pump housing 18s with electrical conductors 40 of seal section housing 20a. As the male pump-seal electrical connectors are being extended into the female pump-seal electrical connectors, chemical product 56 will surround electrical connectors 42, displacing any environmental fluids and creating a dry surface around electrical connectors 42 during the electrical connection process.

A coiled tubing unit can be used to lower electrical submersible pump assembly 14 with coiled tubing 34. The hydrocarbons are artificially lifted by electrical submersible pump assembly 14 and produced to wellhead assembly 28 through coiled tubing 34. If electrical submersible pump assembly 14 has to be pulled out for any reason, electrical submersible pump assembly 14 can be retrieved safely with coiled tubing.

Therefore, as disclosed herein, embodiments of the systems and methods of this disclosure will provide cost savings relative to current electrical submersible pumping assemblies due to simpler and faster installation operations which can be handled rig-less by only two crew members. Embodiments of this disclosure can be deployed in a variety of well types, including those with either high or low gas oil ratios. Systems and methods herein can reduce well downtime and human errors and provide for efficient workovers and improve production retention.

Embodiments of the disclosure described herein, therefore, are well adapted to carry out the objects and attain the ends and advantages mentioned, as well as others inherent therein. While a presently preferred embodiment of the disclosure has been given for purposes of disclosure, numerous changes exist in the details of procedures for accomplishing the desired results. These and other similar modifications will readily suggest themselves to those skilled in the art, and are intended to be encompassed within the spirit of the present disclosure and the scope of the appended claims.

What is claimed is:

1. An electrical submersible pump assembly for producing hydrocarbons from a subterranean well, the assembly comprising:
   a motor with a motor housing;
   a seal section with a seal section housing;
   a pump with a pump housing;
   a motor-seal click connector releasably connecting the motor to the seal section and engaged by threadless relative axial movement between the motor and the seal section;
   a pump-seal click connector releasably connecting the pump to the seal section and engaged by threadless relative axial movement between the pump and the seal section;
   electrical conductors located within a sidewall of the motor housing, a sidewall of the seal section housing, and a sidewall of the pump housing;
   a male motor-seal electrical connector axially extending and electrically connecting the electrical conductors of the motor housing with the electrical conductors of the seal section housing;
   a male pump-seal electrical connector axially extending and electrically connecting the electrical conductors of the pump housing with the electrical conductors of the seal section housing; and
   a container of a chemical product, the chemical product being releasable to displace environmental fluids around the electrical conductors by a protrusion of one of the male motor-seal electrical connector and the male pump-seal electrical connector and surrounding the one of the male motor-seal electrical connector and the male pump-seal electrical connector when such one of the male motor-seal electrical connector and the male pump-seal electrical connector moves from a retracted position to an extended position and protrudes into and extends through the container of the chemical product.

2. The assembly of claim 1, further comprising:
   a female motor-seal electrical connector aligned with the male motor-seal electrical connector, wherein the male motor-seal electrical connector is extendable into the female motor-seal electrical connectors; and
   a female pump-seal electrical connector aligned with the male pump-seal electrical connector, wherein the male pump-seal electrical connector is extendable into the female pump-seal electrical connector.

3. The assembly of claim 2, wherein:
   the male motor-seal electrical connector is located on one of the motor housing and the seal section housing and the female motor-seal electrical connectors is located on the other of the motor housing and the seal section housing; and
   the male pump-seal electrical connector is located on one of the pump housing and the seal section housing and the female motor-seal electrical connectors is located on the other of the pump housing and the seal section housing.

4. The assembly of claim 1, wherein the male motor-seal electrical connector and the male pump-seal electrical connector are moveable between a retracted position where segments of the male motor-seal electrical connector and the male pump-seal electrical connector are nested and an extended position where the segments are positioned end to end.

5. The assembly of claim 1, wherein the motor-seal click connector includes a radially biased arm located on one of the motor and the seal section that engages a recess of the other of the motor and the seal section.

6. The assembly of claim 1, wherein the pump-seal click connector includes a radially biased arm located on one of the pump and the seal section that engages a recess of the other of the pump and the seal section.

7. An electrical submersible pump assembly for producing hydrocarbons from a subterranean well, the assembly comprising:
   a motor with a motor housing;
   a seal section with a seal section housing;
   a pump with a pump housing;
   a click connector releasably connecting the motor and the pump and the seal section and engaged by relative axial movement between the motor and the pump and the seal section;
   electrical conductors located within a sidewall of the motor housing, a sidewall of the seal section housing, and a sidewall of the pump housing, the electrical conductors including a male electrical connector and a female electrical connector; and
   electrical connectors electrically connecting the electrical conductors of the motor housing with the electrical conductors of the seal section housing and connecting the electrical conductors of the pump housing with the electrical conductors of the seal section housing; wherein
   the electrical connectors are surrounded by a chemical product during a connection operation of the electrical conductors, wherein the chemical product is located in a container and is releasable to surround the electrical conductors and displace any environmental fluids around the electrical conductors when the male electrical connector moves from a retracted position to an extended position and protrudes into and extends through the container.

8. The assembly of claim 7, wherein the electrical connectors include:
   male motor-seal electrical connectors axially extending and located on one of the motor housing and the seal section housing and female motor-seal electrical connectors located on the other of the motor housing and the seal section housing and aligned with the male motor-seal electrical connectors, wherein the male motor-seal electrical connectors are extendable into the female motor-seal electrical connectors; and
   male pump-seal electrical connectors axially extending and located on one of the pump housing and the seal section housing and female pump-seal electrical connectors located on the other of the pump housing and the seal section housing and aligned with the male pump-seal electrical connectors, wherein the male pump-seal electrical connectors are extendable into the female pump-seal electrical connectors.

9. The assembly of claim 7, wherein the chemical product is located in the container located at an end of the pump housing, and end of the motor housing, and at a first and second end of the seal section housing.

10. The assembly of claim 7, wherein the electrical connectors include a male electrical connector that is moveable from a retracted position to an extended position where the male electrical connector extends through the chemical product.

11. The assembly of claim 7, wherein the electrical connectors include male electrical connectors that are moveable between a retracted position where segments of the male electrical connectors are nested and an extended position where the segments are positioned end to end.

12. The assembly of claim 7, wherein the click connector includes a radially biased arm located on one of the motor, the pump, and the seal section that engages a recess on another of the motor, the pump, and the seal section.

13. A method for producing hydrocarbons from a subterranean well with an electrical submersible pump assembly, the method comprising:
providing a motor with a motor housing, a seal section with a seal section housing, a pump with a pump housing, and electrical conductors located within a sidewall of the motor housing, a sidewall of the seal section housing, and a sidewall of the pump housing;
releasably connecting the motor to the seal section with a motor-seal click connector by threadless relative axial movement between the motor and the seal section;
releasably connecting the pump to the seal section with a pump-seal click connector by threadless relative axial movement between the pump and the seal section;
electrically connecting the electrical conductors of the motor housing with the electrical conductors of the seal section housing with an axially extending male motor-seal electrical connector;
electrically connecting the electrical conductors of the pump housing with the electrical conductors of the seal section housing with an axially extending male pump-seal electrical connector; and
releasing a chemical product to surround one of the male motor-seal electrical connector and the male pump-seal electrical connector during the electrical connection of such male motor-seal electrical connector or male pump-seal electrical connector, where the chemical product is located within a container, the chemical product being releasable to displace environmental fluids around the electrical conductors by a protrusion of the one of the male motor-seal electrical connector and the male pump-seal electrical connector and surrounding the one of the male motor-seal electrical connector and the male pump-seal electrical connector when such one of the male motor-seal electrical connector and the male pump-seal electrical connector moves from a retracted position to an extended position and protrudes into and extends through the container of the chemical product.

14. The method of claim 13, wherein:
electrically connecting the electrical conductors of the motor housing with the electrical conductors of the seal section housing includes aligning the male motor-seal electrical connector with a female motor-seal electrical connector and extending the male motor-seal electrical connector into the female motor-seal electrical connector; and
electrically connecting the electrical conductors of the pump housing with the electrical conductors of the seal section housing includes aligning the male pump-seal electrical connector with a female pump-seal electrical connector and extending the male pump-seal electrical connector into the female pump-seal electrical connector.

15. The method of claim 13, wherein the male motor-seal electrical connector and the male pump-seal electrical connector are moveable between a retracted position where segments of the male motor-seal electrical connector and the male pump-seal electrical connector are nested and an extended position where the segments are positioned end to end.

16. The method of claim 13, wherein releasably connecting the motor to the seal section includes locating a radially biased arm of the motor-seal click connector of one of the motor and the seal section that into a recess of the other of the motor and the seal section.

17. The method of claim 13, wherein releasably connecting the pump to the seal section includes locating a radially biased arm of the pump-seal click connector of one of the pump and the seal section into a recess of the other of the pump and the seal section.

18. An electrical submersible pump assembly for producing hydrocarbons from a subterranean well, the assembly comprising:
a motor with a motor housing;
a seal section with a seal section housing;
a pump with a pump housing;
a motor-seal click connector releasably connecting the motor to the seal section and engaged by threadless relative axial movement between the motor and the seal section;
a pump-seal click connector releasably connecting the pump to the seal section and engaged by threadless relative axial movement between the pump and the seal section;
electrical conductors located within a sidewall of the motor housing, a sidewall of the seal section housing, and a sidewall of the pump housing;
a male motor-seal electrical connector axially extending and electrically connecting the electrical conductors of the motor housing with the electrical conductors of the seal section housing;
a male pump-seal electrical connector axially extending and electrically connecting the electrical conductors of the pump housing with the electrical conductors of the seal section housing; and
wherein the male motor-seal electrical connector and the male pump-seal electrical connector are moveable between a retracted position where three segments of the male motor-seal electrical connector and the male pump-seal electrical connector are nested where a segment with a smallest diameter is circumscribed by an intermediate segment and both the segment with the smallest diameter and the intermediate segment are located within an inner bore of a radially outward segment, and an extended position where the three segments are positioned end to end in an axial direction.

19. The assembly of claim 18, further comprising a container of a chemical product, the chemical product being releasable by a protrusion of one of the male motor-seal electrical connector and the male pump-seal electrical connector and surrounding the one of the male motor-seal electrical connector and the male pump-seal electrical connector.

20. The assembly of claim 1, wherein the male motor-seal electrical connector and the male pump-seal electrical connector are moveable from a retracted position to an extended position where the male motor-seal electrical connector and the male pump-seal electrical connector extend through the chemical product.

21. A method for producing hydrocarbons from a subterranean well with an electrical submersible pump assembly, the method comprising:
- providing a motor with a motor housing, a seal section with a seal section housing, a pump with a pump housing, and electrical conductors located within a sidewall of the motor housing, a sidewall of the seal section housing, and a sidewall of the pump housing;
- releasably connecting the motor to the seal section with a motor-seal click connector by threadless relative axial movement between the motor and the seal section;
- releasably connecting the pump to the seal section with a pump-seal click connector by threadless relative axial movement between the pump and the seal section;
- electrically connecting the electrical conductors of the motor housing with the electrical conductors of the seal section housing with an axially extending male motor-seal electrical connector;
- electrically connecting the electrical conductors of the pump housing with the electrical conductors of the seal section housing with an axially extending male pump-seal electrical connector; and
- wherein the male motor-seal electrical connector and the male pump-seal electrical connector are moveable between a retracted position where three segments of the male motor-seal electrical connector and the male pump-seal electrical connector are nested where a segment with a smallest diameter is circumscribed by an intermediate segment and both the segment with the smallest diameter and the intermediate segment are located within an inner bore of a radially outward segment, and an extended position where the three segments are positioned end to end in an axial direction.

22. The method of claim 21, further comprising releasing a chemical product to surround one of the male motor-seal electrical connector and the male pump-seal electrical connector during the electrical connection of such male motor-seal electrical connector or male pump-seal electrical connector.

* * * * *